United States Patent [19]

Royka, Jr. et al.

[11] Patent Number: 5,649,437
[45] Date of Patent: Jul. 22, 1997

[54] LOCKABLE COVER FOR THREADED SPOUT

[76] Inventors: Edward Royka, Jr., 5452 Blackberry Way, Oceanside, Calif. 92057; David Rousseau, 17360 Early Star Dr., Monument, Colo. 80132

[21] Appl. No.: 593,346

[22] Filed: Jan. 29, 1996

[51] Int. Cl.$^6$ ...................................... B65D 55/14
[52] U.S. Cl. .................. 70/164; 70/165; 70/178; 70/180; 70/232; 137/382; 251/90
[58] Field of Search .................. 70/163, 164, 165, 70/166, 170, 171, 232, 175–180; 137/382; 251/90

[56] References Cited

U.S. PATENT DOCUMENTS

| | | |
|---|---|---|
| 1,084,996 | 1/1914 | Wright . |
| 1,599,685 | 9/1926 | Spaeth ........................ 70/164 |
| 1,634,672 | 7/1927 | Mallory . |
| 1,636,641 | 7/1927 | Lewis ........................ 70/164 |
| 2,648,517 | 8/1953 | Berland et al. . |
| 2,686,530 | 8/1954 | Dire ........................ 137/375 |
| 2,994,447 | 8/1961 | Haynes ........................ 70/164 |
| 3,090,218 | 5/1963 | Birkness ........................ 70/179 |
| 3,448,762 | 6/1969 | Schmitt ........................ 137/383 |
| 3,756,047 | 9/1973 | Mulberry ........................ 70/164 |
| 3,983,726 | 10/1976 | Rausch ........................ 70/164 |
| 4,107,959 | 8/1978 | Skarzyuski et al. ........................ 70/164 X |
| 4,244,394 | 1/1981 | Hartselle ........................ 137/375 |
| 4,456,027 | 6/1984 | Belgard ........................ 137/375 |
| 4,473,244 | 9/1984 | Hill ........................ 285/14 |
| 4,577,655 | 3/1986 | Carroll ........................ 137/375 |
| 4,889,160 | 12/1989 | Sneets ........................ 137/588 |
| 5,027,626 | 7/1991 | Appelbaum ........................ 70/164 |
| 5,092,359 | 3/1992 | Werth et al. ........................ 137/382 |
| 5,193,336 | 3/1993 | King ........................ 59/7 |
| 5,201,201 | 4/1993 | Sylvester et al. ........................ 70/232 X |
| 5,439,130 | 8/1995 | Waugh ........................ 70/164 X |

FOREIGN PATENT DOCUMENTS 86945  1/1922  Austria ........................ 70/165

*Primary Examiner*—Lloyd A. Gall
*Attorney, Agent, or Firm*—Donn K. Harms

[57] ABSTRACT

A lockable cover and seal for a threaded nozzle or spout, such as a hose bib cock assembly having a passageway, an end face, an external threaded portion adjacent the end face, and anti-siphon valve in the passageway including a portion protruding outward of the end face, generally includes, in combination, a lid, a seal, a swivel arm, and a shielding cap. The lid is bell-shaped and has a central axis, an inner end including a threaded portion for threaded engagement with the threaded portion of the spout, a central cavity and an annular shoulder facing inwardly for juxtaposition to the spout end face. The seal includes an inner side for sealing against the end face of the spout and an outer side for sealing against said annular shoulder and a forward extending central recess for receiving any protruding portion of the anti-siphon valve. The swivel arm includes an inner end rotatingly attached to the outer end of the lid such that the swivel arm is rotatable about the central axis and an outer end including an eye for attaching a lock. A bell-shaped cap fits over the lid and includes an outer end wall having a central orifice therethrough for receiving the swivel arm. The cap extends forward to enclose the lid attached to the spout such that the lid is inaccessible for turning and the cap is freely rotatable about the central axis and incapable of engaging and rotating said lid.

4 Claims, 1 Drawing Sheet

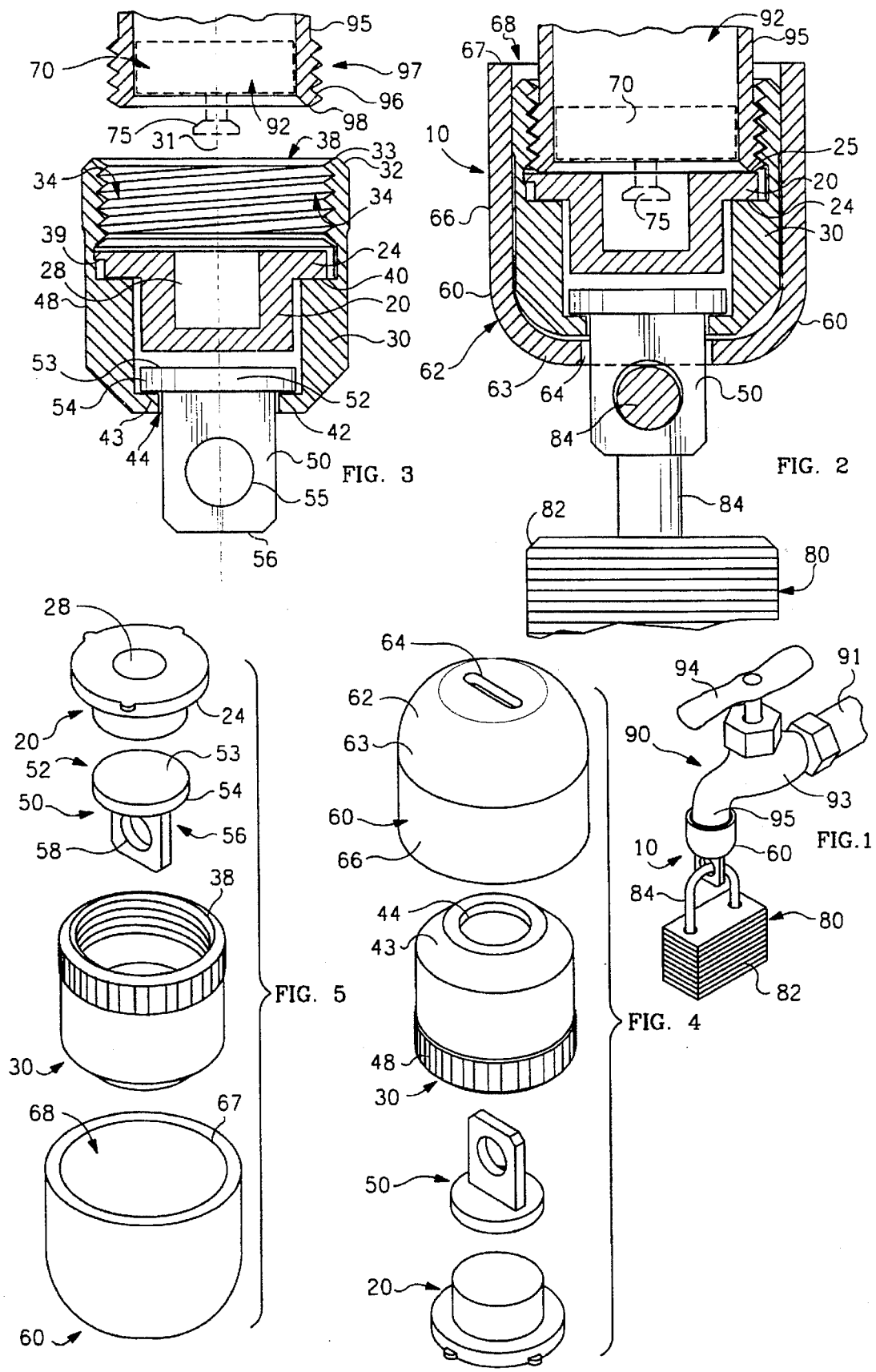

LOCKABLE COVER FOR THREADED SPOUT

BACKGROUND OF THE INVENTION

1. Field of the Invention

This invention relates in general to a device for preventing unauthorized use of a nozzle or spout for dispensing fluid and more specifically to a seal and locking enclosure for a threaded hose spout.

2. Description of the Prior Art

Conventional hose bib cock assemblies, such as commonly installed outside of a building for providing water, generally include a spout having external threads for attachment of a hose.

Often it is desirable to prevent unauthorized use of a spout. Devices addressing this issue lock or otherwise seal off the valve assembly or valve handle. Such devices are large and cumbersome and, also, expensive.

Therefore there has been a need for a small, inexpensive, simple locking device for a spout.

Often it is also desirable to seal a spout, either to provide a primary seal or to provide a backup seal to the conventional valve.

Therefore, it is additionally desirable and advantageous if a locking device also seals the spout.

SUMMARY OF THE INVENTION

This invention is a lockable cover for a threaded nozzle or spout, such as a hose bib having a passageway, an end face, and an external threaded portion adjacent the end face. The exemplary embodiment will lock off and seal the passageway of a spout having an anti-siphon valve in the passageway including a portion protruding outward of the end face.

In the exemplary embodiment, the invention generally includes, in combination, a lid, a seal, a swivel arm, and a shielding cap. The lid is bell-shaped and has a central axis, an inner end including a threaded portion for threaded engagement with the threaded portion of the spout, an outer end including an end wall, and, within a central cavity, an annular shoulder facing inwardly for juxtaposition to the spout end face. The seal includes an inner side for sealing against the end face of the spout and an outer side for sealing against said annular shoulder and a forward extending central recess for receiving any protruding portion of the anti-siphon valve. The swivel arm includes an inner end rotatingly attached to the outer end of the lid such that the swivel arm is rotatable about the central axis and an outer end including an eye for attaching a lock. A bell-shaped cap fits over the lid and includes an outer end wall having a central orifice therethrough for receiving the swivel arm. The cap extends forward to enclose the lid attached to the spout such that the lid is inaccessible for turning and the cap is freely rotatable about the central axis and incapable of engaging and rotating said lid.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 1 is a perspective view of a preferred embodiment of the cover of the invention locked onto the threaded spout of a faucet.

FIG. 2 is an enlarged cross-sectional view of the locked cover of FIG. 1.

FIG. 3 is a cross-sectional view of the cover of FIG. 2, without a shielding cap, in position for attachment to a threaded spout.

FIG. 4 is an exploded perspective view from the outer end of the cover.

FIG. 5 is an exploded perspective view from the inner end of the cover.

DETAILED DESCRIPTION OF THE INVENTION

With reference now to the drawings, there is shown in FIG. 1 a perspective view of a preferred embodiment of the cover, denoted generally as 10, of the invention, as it would be commonly used locked with lock 80 onto the threaded spout 95 of a faucet, denoted generally as 90. Cover 10 includes a shielding cap 60 generally covering the remainder of the device. Although, faucet 90, shown, is a conventional hose bib cock assembly such as is typically installed external to a structure, it will be seen and appreciated that cover 10 may be attached to any threaded nozzle or spout. Faucet 90 generally comprises a source of fluid, such as feeder or input pipe 91, valve assembly 93, including handle 94, and spout 95. Lock 80 is of conventional construction comprising a body 82 and shackle 84.

During the following detailed descriptions based on FIGS. 2 and 3, glancing reference should be made to FIGS. 4 and 5, exploded perspective views as an aid to comprehension.

Turning momentarily to FIG. 2, there is shown an enlarged cross-sectional view of the locked cover 10 of FIG. 1 threadably attached to spout 95. Cover 10 generally includes seal 20, lid 30, swivel arm 50 and shielding cap 60. Shielding cap 60 is locked on with lock 80.

FIG. 3 best shows the manner of attachment. FIG. 3 is a cross-sectional view of the cover 10 of FIG. 2, but without shielding cap 60, in position for attachment to a threaded spout 95 having an internal passageway 92 for fluid passage. Spout 95 includes an end portion 96 terminating in an end face 98 and a threaded portion 97 adjacent end face 98. Spout 95 may include anti-siphon device 70, shown in phantom, within central passageway 92. Ant-siphon device 70 may include a protruding portion, such as vacuum breaker plunger 75, that extends forward of end face 98.

Lid 30 has a central axis 31, an inner end 32 and an outer end 42. Inner end 32 includes an end face 33 and a threaded portion 34, adjacent end face 33; threaded portion 34 for threaded engagement with the threaded portion 97 of spout 95. Outer end 42 includes an end wall 43. Side wall 48 extends from the periphery of end wall 43 to end face 33. End wall 43 and side wall 48 define an internal cavity 38. Preferably, side wall 48 is externally cylindrical and may be knurled for increased hand grip to facilitate hand tightening of lid 30 on spout 95. Within internal cavity 38, annular channel 39 retains seal 20. Annular channel 39 includes an annular shoulder 40 which faces inwardly juxtaposed to spout end face 98 for supporting seal 20. End wall 43 includes a central bore 44 therethrough. Preferably, central bore 44 is circular.

Sealing means, such as seal 20, seals between lid 30 and end face 98 of faucet 95 and also seals off passageway 92. Seal 20 is cylindrical or hat-shaped, as shown, and is made of any suitable resilient material, such as rubber or soft plastic. Seal 20 is resiliently fitted into cap channel 39. Seal 20 includes an annular flange 24. As seen in FIG. 2, annular flange 24 includes an inner side 25 for sealing against end face 98 of spout 95, and an outer side for sealing against annular shoulder 40 of cap 30. When lid 30 is attached to spout 95, seal 20 completely blocks passageway 92. Seal 20 includes a means, such as forward extending central recess 28, in the attached position for receiving any protruding portion of anti-siphon valve 70 such as vacuum breaker 75. Although a single seal 20 is shown to seal between lid 30 and end face 98 and to seal off passageway 92, other sealing means are contemplated. For example, the sealing means could be a sealing gasket, such as a rubber washer, sealing between lid 30 and end face 98 and then passageway 92 could be sealed off by enclosing or otherwise sealing off the outer end internal cavity 38.

Swivel arm 50 includes an inner end 52 and an outer end 56. Swivel arm 50 projects through central bore 44 in cap end wall 43. Inner end 52 includes end face 53 and attachment means, such as annular bearing lip or flange 54, for bearing against the inside of end wall 43 of lid 30 adjacent central bore 44 for rotatingly attaching inner end 52 of swivel arm 50 to outer end 42 of lid 30 such that swivel arm 50 is freely rotatable about central axis 31. Outer end 56 includes means, such as eye 58, for attaching lock shackle 84 for preventing removal of cap 60. Although a preferred swivel arm 50 is shown, swivel arm 50 may be of different design, such as a more common latch swivel eye which commonly has an inner end rotatingly attached to a socket, the socket attached such as by screws or welding to outer end 42 of lid 30.

Lid 30 including seal 20 and swivel arm 50 is attached to spout 95 by screwing lid threads 34 onto spout threads 97, that is by rotating lid 30 such as by griping it with a hand until seal 20 seals off spout passageway 92.

Returning to FIG. 2, lid 30 with seal 20 and swivel arm 50 is shown attached to spout 95. Inner side 25 of seal flange 24 seals against end face 98 of faucet spout 95 and outer side 26 of seal flange 24 seals against lid shoulder 40. The protruding vacuum breaker plunger 75 is received in seal recess 28. Swivel arm 50 may freely rotate in bore 44.

Shielding cap 60 includes an outer end 62 comprising an end wall 63 having a central orifice 64 therethrough. Side wall 66 extends forward from end wall 63 to terminate at end face 67. End wall 63 and side wall 66 define a compartment 68 enclosing lid 30 when lid 30 is attached to spout 95 such that lid 30 is inaccessible for turning and un-threading from spout 95. Cap 60 is placed covering lid 30 such that swivel arm 50 is disposed through central orifice 64. Preferably, the size and shape of central orifice 64 conforms with the cross-section of swivel arm 50 so that lid 30 can not be accessed through central orifice 64.

Means, such as lock shackle 84, retains cap 60 such that cap 60 is supported ultimately in the shielding position by swivel arm 50. Cap 60, swivel arm 50 and lock 80 freely rotate. In the shielding position, cap 60 can freely rotate about central axis 31 and is incapable of engaging and rotating lid 30. Cap 60 is made of strong material, preferably of steel or hard aluminum, such that cap 60 cannot readily be compressed onto lid 30 for engaging and rotating lid 30.

FIG. 4, an exploded perspective view of cover 10 from the outer end, and FIG. 5, an exploded perspective view of cover 10 from the inner end, aid in showing the construction and relationship of the elements of the preferred embodiment.

Having described the invention, it can be seen that it provides a very convenient device for sealing a threaded spout or nozzle for preventing leakage and for preventing the unauthorized use of the spout.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A lockable cover for a spout having a passageway, an end face and a threaded portion adjacent the end face comprising:

a lid having a central axis; said lid comprising:
an inner end including:
a threaded portion for threaded engagement with the threaded portion of the spout; and
an outer end;

a means for sealing the passageway of the spout locateable between said lid and the end face of the spout;

a forward extending central recess located in said means for sealing the passageway for receiving any protruding portion of an anti-siphon valve located in said passageway;

a swivel arm including:
an inner end including:
attachment means for rotatingly attaching said inner end of said swivel arm to said outer end of said lid such that said swivel arm is rotatable about said central axis; and
an outer end including:
means for attaching a lock; and a cap including:
an outer end comprising:
an end wall having a central orifice therethrough; and
a side wall extending forward from said end wall; said side wall defining a compartment; said cap having a shielding position wherein said swivel arm is disposed through said central orifice such that said means for attaching a lock is outside said end wall of said cap for receiving a lock for locking said cap such that said compartment encloses said lid when said lid is attached to the spout such that said lid is inaccessible for turning and wherein said cap is freely rotatable about said central axis and incapable of engaging and rotating said lid.

2. The lockable cover of claim 1 additionally comprising:

said outer end of said lid having an inside surface and including:
a central bore therethrough; and
said attachment means of said inner end of said swivel arm including:
an annular lip for bearing against said inside surface of said outer end of said lid adjacent said central bore.

3. The lockable cover of claim 1 wherein said swivel arm is laterally translatable about said central axis.

4. The lockable cover of claim 1 wherein said means for sealing is comprised of rubber or plastic.

* * * * *